(12) United States Patent
Christiansen et al.

(10) Patent No.: US 12,136,358 B2
(45) Date of Patent: Nov. 5, 2024

(54) METHOD FOR INTEGRATING A DISPLAY IN AN OUTER SKIN OF A VEHICLE BODY

(71) Applicant: Bayerische Motoren Werke Aktiengesellschaft, Munich (DE)

(72) Inventors: Jasper Christiansen, Hamburg (DE); Patrick Dumm, Offenstetten (DE); Torben Effner, Altfraunhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 377 days.

(21) Appl. No.: 17/780,208

(22) PCT Filed: Nov. 19, 2020

(86) PCT No.: PCT/EP2020/082691
§ 371 (c)(1),
(2) Date: May 26, 2022

(87) PCT Pub. No.: WO2021/104989
PCT Pub. Date: Jun. 3, 2021

(65) Prior Publication Data
US 2022/0415222 A1     Dec. 29, 2022

(30) Foreign Application Priority Data
Nov. 26, 2019   (DE) .................... 10 2019 131 997.8

(51) Int. Cl.
*G09F 21/04*     (2006.01)
*B60K 35/00*    (2024.01)
(Continued)

(52) U.S. Cl.
CPC ............ *G09F 21/048* (2013.01); *B60K 35/00* (2013.01); *G06Q 30/0266* (2013.01);
(Continued)

(58) Field of Classification Search
CPC ....... G09F 21/048; G09F 9/372; B60K 35/00; B60K 35/50; B60K 35/60;
(Continued)

(56) References Cited

U.S. PATENT DOCUMENTS 3,826,026 A * 7/1974 Bevan ...................... G09F 7/04
40/644
5,615,501 A   4/1997 Rice
(Continued)

FOREIGN PATENT DOCUMENTS

CN          1224390 A     7/1999
CN       201366952 Y    12/2009
(Continued)

OTHER PUBLICATIONS

International Search Report (PCT/ISA/210) issued in PCT Application No. PCT/EP2020/082691 dated Feb. 24, 2021 with English translation (five (5) pages).
(Continued)

*Primary Examiner* — Lori Lyjak
(74) *Attorney, Agent, or Firm* — Crowell & Moring LLP

(57) ABSTRACT

A method integrates a display, in particular an electronic display, in an outer skin of a vehicle, in one region of a body of the vehicle. The outer skin of the vehicle body, at least in the region of the vehicle body, is formed by a plastic molding, or at least has such a plastic molding. The display is formed together with the plastic moulding, in a joint moulding step, to give a vehicle-body contour, wherein the display surface of the display faces away from the plastic molding.

13 Claims, 1 Drawing Sheet

(51) Int. Cl.
   *B60K 35/50* (2024.01)
   *B60K 35/60* (2024.01)
   *G06Q 30/0251* (2023.01)
   *G09F 9/37* (2006.01)

(52) U.S. Cl.
   CPC .............. *G09F 9/372* (2013.01); *B60K 35/50* (2024.01); *B60K 35/60* (2024.01); *B60K 2360/692* (2024.01); *B60K 2360/797* (2024.01); *B60K 2360/816* (2024.01)

(58) Field of Classification Search
   CPC ........ B60K 2360/692; B60K 2360/797; B60K 2360/816; G06Q 30/0266
   See application file for complete search history.

(56) References Cited

U.S. PATENT DOCUMENTS

| | | | |
|---|---|---|---|
| 6,178,605 | B1 | 1/2001 | Romero Magarino et al. |
| 2003/0129297 | A1 | 7/2003 | Jakobi et al. |
| 2009/0257241 | A1* | 10/2009 | Meinke .................. B60Q 1/543 362/546 |
| 2010/0146833 | A1* | 6/2010 | Harris ..................... G09F 21/04 40/606.01 |
| 2012/0032592 | A1 | 2/2012 | Breunig et al. |
| 2013/0263512 | A1* | 10/2013 | Hus ........................... G09F 9/30 49/70 |
| 2015/0032328 | A1 | 1/2015 | Healey et al. |
| 2017/0182932 | A1 | 6/2017 | Muenker et al. |
| 2017/0200197 | A1 | 7/2017 | Brubaker |
| 2017/0251086 | A1* | 8/2017 | Gagne-Keats ............ B22F 5/00 |
| 2019/0077262 | A1* | 3/2019 | Benjamin ............... C03C 27/10 |
| 2019/0080637 | A1 | 3/2019 | Kanaguchi et al. |
| 2019/0172094 | A1* | 6/2019 | Murray .............. G06Q 30/0266 |
| 2019/0172411 | A1 | 6/2019 | Murray et al. |
| 2019/0213931 | A1 | 7/2019 | Brubaker |
| 2019/0333114 | A1* | 10/2019 | Snyder ............... G06Q 30/0266 |

FOREIGN PATENT DOCUMENTS

| | | | | |
|---|---|---|---|---|
| CN | 101708642 | A | 5/2010 | |
| CN | 201804525 | U | 4/2011 | |
| CN | 202463726 | U | 10/2012 | |
| CN | 203601405 | U | 5/2014 | |
| CN | 203713737 | U | 7/2014 | |
| CN | 107077810 | A | 8/2017 | |
| CN | 107154231 | A | 9/2017 | |
| CN | 109311433 | A | 2/2019 | |
| CN | 109484316 | A | 3/2019 | |
| CN | 109870170 | A | 6/2019 | |
| CN | 109872658 | A | 6/2019 | |
| CN | 110341585 | A | 10/2019 | |
| DE | 10 2004 060 810 | A1 | 6/2006 | |
| DE | 102013004612 | A1 * | 9/2014 | ............. B60K 35/00 |
| DE | 102013014104 | A1 * | 2/2015 | ............. B60K 35/00 |
| DE | 10 2014 206 034 | A1 | 10/2015 | |
| DE | 10 2016 103 885 | A1 | 9/2016 | |
| DE | 102019131997 | A1 * | 5/2021 | ............. B60K 35/00 |
| FR | 2929563 | A1 * | 10/2009 | ............. B60K 35/00 |
| GB | 2568934 | A * | 6/2019 | ............. B60K 35/00 |
| KR | 10-0764612 | B1 | 10/2007 | |
| KR | 101379615 | B1 * | 3/2014 | |
| WO | WO 02/077518 | A1 | 10/2002 | |
| WO | WO 2005/025275 | A1 | 3/2005 | |

OTHER PUBLICATIONS

German-language Written Opinion (PCT/ISA/237) issued in PCT Application No. PCT/EP2020/082691 dated Feb. 24, 2021 (six (6) pages).

German-language Search Report issued in German Application No. 10 2019 131 997.8 dated Sep. 16, 2020 with partial English translation (13 pages).

English translation Office Action issued in Chinese Application No. 202080079079.5 dated Sep. 26, 2023 (6 pages).

English translation of Chinese-language Office Action issued in Chinese Application No. 202080079079.5 dated Apr. 1, 2024 (9 pages).

English translation of Chinese-language Office Action issued in Chinese Application No. 202080079079.5 dated May 15, 2023 (7 pages).

* cited by examiner

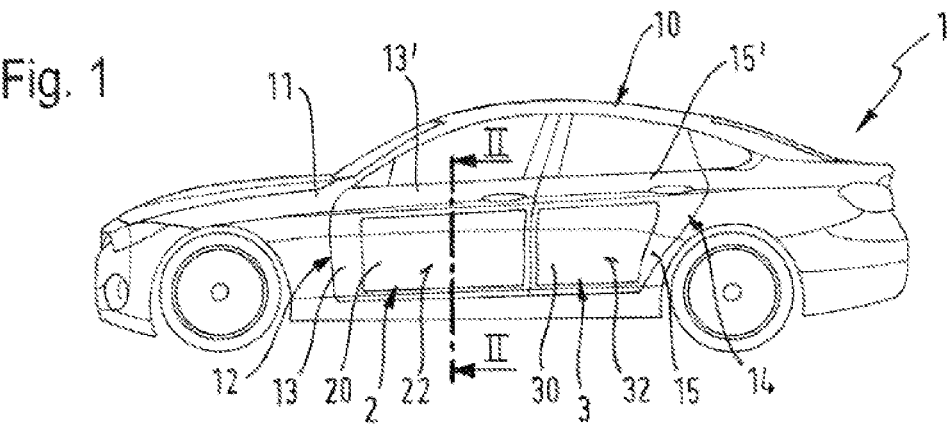
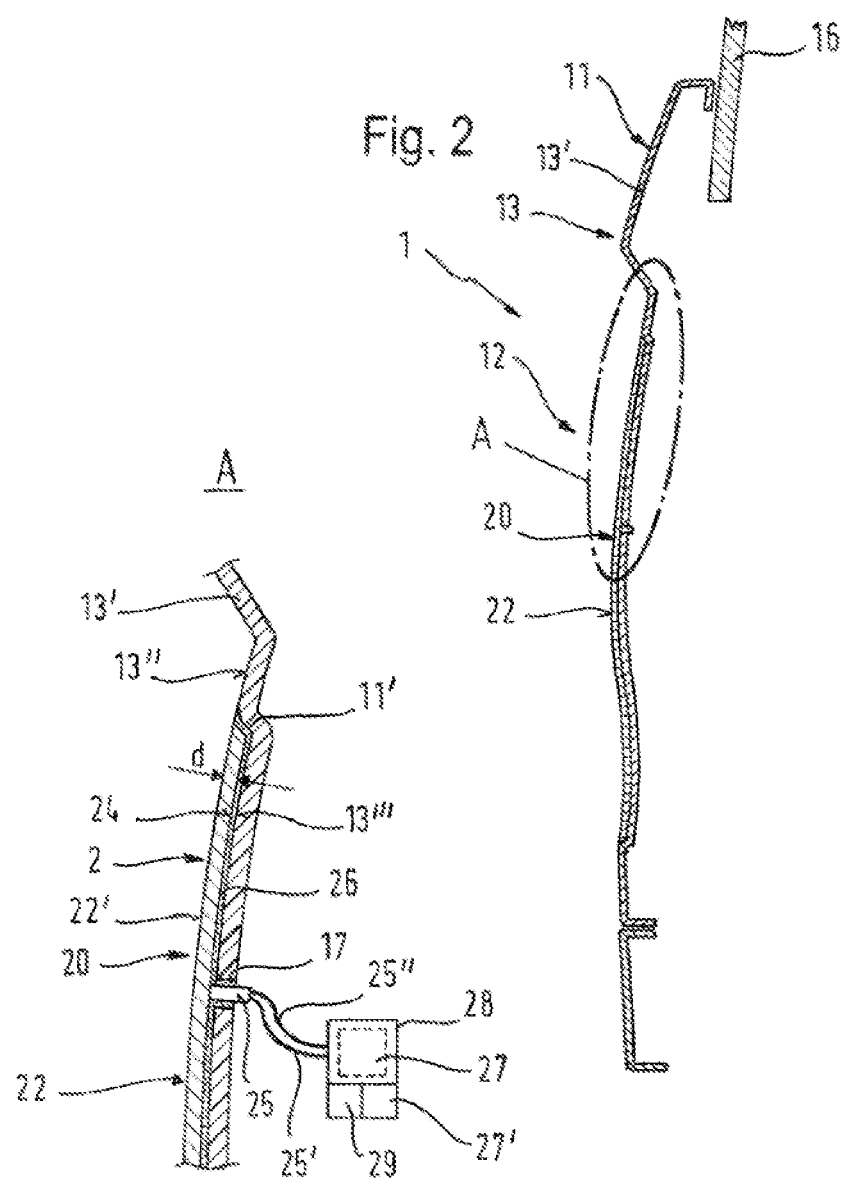

METHOD FOR INTEGRATING A DISPLAY IN AN OUTER SKIN OF A VEHICLE BODY

TECHNICAL FIELD

The invention relates to a method for integrating a display device, in particular an electronic display device, into a body outer skin of a vehicle according to the preamble of claim 1. The invention furthermore relates to a vehicle that is provided in accordance with such a method with at least one display device in the region of the body outer skin.

BACKGROUND AND SUMMARY

Advertising on cars, for example on taxis or company vehicles, nowadays predominantly consists of printed sheets that are stuck onto the vehicle body. Any change in one's own advertising presence or the client's advertisements that are on view on the vehicle always requires that the prior advertisement sheet be removed from the vehicle body and the new advertisement sheet be applied, which in turn causes downtimes for the vehicle. When renting a vehicle as a company vehicle, for example a rental vehicle or a car sharing vehicle, at short notice and for a short period of time, it is not economical to apply an advertisement sheet to the vehicle for the short rental period and to then remove the sheet again, which means that in these cases, the vehicle is not used as an advertising medium. It would therefore be desirable to have a flexible option that allows the use of the outer surface of a vehicle body for displaying advertisements, information, or other messages, without high levels of expenditure being incurred and without this being associated with a great deal of outlay.

It is known from WO 2005/025275 A1 to provide the outer surface of a vehicle body at least partially with an OLED display sheet in order to be able to display information or signals on the body outer side or even to give the entire body surface a variably selectable appearance.

It is known from US 2015/0032328 A1 to provide display devices, for example screens, projectors, or panes that are able to be darkened in a controllable manner, on the outer side of a vehicle or in the vehicle windows in order to thereby allow information to be displayed toward the outside. The document also already proposes to use E Ink display technology as is known from e-books in addition to electrochromic elements or LCD displays in order to present information on vehicle windows or other components associated with the vehicle.

Aside from the fact that the use of vehicle windows with electrochromic display properties can impair the traffic safety of the vehicle, the application of display devices on the outside of the vehicle body poses problems because, for one, the outer design of the vehicle is changed and, for the other, cables for the power supply and possibly also data lines need to be guided through the vehicle body to the display device. Such fitting or retrofitting of vehicles to become advertising and information media with display devices mounted outside on the vehicle body therefore frequently looks like a makeshift solution. In addition, it is possible that such display devices which are mounted outside on the vehicle body impair the automotive aerodynamics or may even represent injury hazards to other road users and impair the utilizability of automatic wash systems.

The object of the present invention is to improve a method for integrating an electronic display device into a body outer skin of a vehicle in a manner such that the optical impression of the vehicle is improved, without negatively affecting the suitability of the vehicle for everyday use. Moreover, it is a part of the object to specify a vehicle that is equipped in this way.

The part of the object that is directed at the method is achieved by way of the features of the independent claim.

A method for integrating a display device, in particular an electronic display device, into a body outer skin of a vehicle in a region of a body of the vehicle, wherein the body outer skin is formed by a molded plastics part at least in this region of the body or at least has such a molded plastics part, is characterized according to the invention in that the flexible display device, which is preferably designed like a sheet, is formed together with the molded plastics part in a common molding step to form a body contour, wherein the display area of the display device faces away from the molded plastics part.

Dependent claims relate to further preferred and advantageous configuration features of the method according to the invention.

Preferably, the display device is connected to the molded plastics part in a common molding step.

In an advantageous embodiment of the method of the invention, which is combinable with the other embodiments, an adhesion promoter is provided between the rear surface of the display device facing away from the display area of the display device and the surface of the molded plastics part facing it. In this way, a particularly reliable and durable integration of the display device into the body outer skin is achieved.

A first variant of the method according to the invention in which the molded plastics part is formed as an injection molding part and which has the following steps is advantageous:

placing the display device into a molding element of an injection mold, closing the injection mold and injecting the plastics material for the molded plastics part into the injection mold, and removing the molded plastics part connected to the display device from the opened injection mold.

This method in which the display device that has been placed into the mold is back-injected is particularly suitable for the integration of relatively small display devices into a molded plastics part having a complex shape. In addition, electrical connections leading away from the display device can also be overmolded, with the result that a passage, which is sealed with respect to the outside, for the electrical connections of the display device through the body outer skin is provided at the same time.

In a second variant of the method according to the invention in which the molded plastics part is formed as a deep-drawn molded part, the following method steps are provided:

placing the display device into a molding element of a deep-drawing mold, placing a blank plastics part for the molded plastics part into the molding element of the deep-drawing mold, deep drawing the display device and the blank plastics part, and removing the molded plastics part connected to the display device from the deep-drawing mold.

This variant is particularly suitable for the integration of large-area display devices into a molded plastics part having only a slight curvature. The flexible display device is here not only integrated into the molded plastics part, but also adopts the surface contour of the molded plastics part and, as a result, is incorporated particularly inconspicuously into the body contour. A passage, which is sealed with respect to the outside, of the electrical connections of the display device through the body outer skin can also be created in this method by guiding electrical connections leading away from the display device through an opening in the blank plastics part when the blank plastics part is placed into the deep-drawing mold, wherein during the deep-drawing operation a close connection of the display device with the blank plastics part, which in the process becomes the molded plastics part, is brought about.

It is particularly advantageous here if the rear surface of the display device facing away from the display area of the display device is provided with an adhesion promoter before the blank plastics part is placed into the molding element of the deep-drawing mold. This ensures a particularly firm connection between the display device and the molded plastics part, which becomes only more durable by the subsequent deep-drawing operation.

In an alternative embodiment of the second variant of the method according to the invention in which the molded plastics part is likewise formed as a deep-drawn molded part, the following steps are provided:

connecting the display device to the blank plastics part, placing the unit composed of the blank plastics part and the display device into a deep-drawing mold, deep drawing the unit composed of the blank plastics part and the display device to form a molded plastics part connected to the display device, and removing the molded plastics part connected to the display device from the deep-drawing mold.

The display device and the blank plastics part provided for molding are here initially connected to one another, for example by adhesive bonding or welding, and the thus formed unit is then deep-drawn and molded into a molded plastics part with an integrated display device. Even in this alternative embodiment of the second variant of the method according to the invention, a passage, which is sealed with respect to the outside, of the electrical connections of the display device through the body outer skin can be created in the same way as was described for the preceding embodiment.

The part of the object directed at the vehicle is achieved by way of a vehicle having the features of the independent claim.

In such a vehicle, which is provided with a vehicle body, in the body outer skin of which at least one electronic display device is provided by means of a method according to the invention so as to be integrated, the display device is part of a display unit having a display device controller that is electrically connected to the display device. The display device controller can be provided here on the inner side of the body outer skin, that is to say in the interior, dry region of the vehicle, behind the display device, as a result of which the length of the control lines leading to the display device is particularly short.

Of advantage here is an embodiment in which the display device has electrodes and a fluid provided with electrically charged particles and in which the display device operates according to the principle of electrophoresis, wherein the electric field applied to the electrodes of the display device effects an alignment of the electrically charged particles in the fluid.

It is also advantageous if the display device is designed as a reflective display device and has electrodes and a fluid provided with electrically charged particles, and if the display device is designed such that, by applying an electric field once, a display is permanently displayed without the need for float voltage, wherein the display is deleted or changed by applying an electric field again, as is already known from what is known as e-paper or E Ink technology, for example. This embodiment is particularly energy-saving since it requires electrical energy only if the display on the display device is changed. Consequently, no energy is used during the standing time of the vehicle if the image displayed is static, which means that no energy is drawn from the vehicle battery.

It is also advantageous here if the display device operates according to the principle of electrophoresis, wherein the electric field applied to the electrodes of the display device effects an alignment of the electrically charged particles in the fluid.

In a variant of the vehicle according to the invention that may be used particularly advantageously, the display device controller has a position data receiver or is connected to such a position data receiver for receiving current position data and is consequently configured to be able to ascertain its own current location. The display device controller is furthermore configured to display on the display device, in the form of text data and/or image data, static or dynamic texts and/or images that are stored in a data memory assigned to the display device controller, in dependence on its own current location. These two features make it possible to display information that is specific to the current location on the display. It is thus possible, for example, to display on the display advertisements for local restaurants or other businesses located in the vicinity of the current location when the vehicle is located in the corresponding area; in other areas, different advertisements or information is/are then displayed in turn. The technical solution characterized by these features allows the implementation of a business model in which display devices provided in the body outer skin of vehicles of a vehicle pool can flexibly display local information or advertisements.

Likewise of particular advantage is an embodiment of the vehicle according to the invention, which is combinable with other embodiments, in which the display device controller is configured to display on the display device, in the form of text data and/or image data, static or dynamic texts and/or images that are stored in a data memory assigned to the display device controller, in dependence on user identification data ascertained by a user identification system (for example a personalized car key or a personalized access card). This variant makes it possible, for example in car sharing vehicles used by different users, to assign specific displays, which automatically appear when a user starts the vehicle, to each corresponding user. For example, if a plurality of small-scale businesses share such a vehicle, the advertisement for or a reference to the business of the current user can in each case be displayed on the display device automatically in dependence on the current user.

Preferred exemplary embodiments of the invention with additional configuration details and further advantages will be described and explained in more detail below with reference to the attached drawings.

BRIEF DESCRIPTION OF THE DRAWINGS

FIG. 1 is a side view of a vehicle provided, as per the method, with a display device integrated into the vehicle body; and FIG. 2 is a vertical section through the front left vehicle door of the vehicle from FIG. 1 viewed in the direction of the arrows II-II.

DETAILED DESCRIPTION OF THE DRAWINGS

FIG. 1 shows a vehicle 1 with a vehicle body 10 in a side view from the left. The vehicle body 10 in turn has four doors, of which FIG. 1 shows the left front door 12 and the left rear door 14. The vehicle body 10 comprises a body outer skin 11, which is visible from the outside and determines the outer body shape. The respective part of the body outer skin 11 that is referred to as the door leaf 13, 15 is formed by a molded plastics part 13', 15'.

An electronic display device 20, 30 of a respective display unit 2, 3 is integrated in each case into the door leaf 13 of the front left vehicle door 12 and into the door leaf 15 of the left rear door 14, wherein the integration is effected in accordance with a method of the present invention.

The respective display device 20, 30 has a display area 22, 32 which faces the exterior of the vehicle 1 and on which displays formed in the respective display device 20, 30 are visible. Although in the example of FIG. 1 only the doors are provided with display devices, it is obvious that other parts of the vehicle body can also be provided with corresponding display devices.

FIG. 2 shows a vertical cross section through the left front door 12 of the vehicle 1 in a schematic illustration. The door leaf 13, which has a strong profile in cross section, is formed by a molded plastics part 13', which determines the body outer skin 11 in this region. A side window 16 provided in the vehicle door 12 is arranged in the conventional manner such that it can be recessed in the door 12. For reasons of clarity, however, the associated window lifter mechanism is not shown in FIG. 2.

As can be seen in the enlarged detail A of FIG. 2, the molded plastics part 13' forming the body outer skin 13 in the region of the door leaf is molded around the rear side 24 of the display device 20 facing away from the outer display area 22 of the display device 20. The cutout 11' that is formed as a result in the body outer skin 11 in this case substantially corresponds to the thickness d of the display device 20. As a result, the outwardly visible surface 13" of the molded plastics part 13' transitions continuously and substantially also seamlessly into the outer surface 22' of the display area 22 of the display device 20, as can be seen in the enlarged illustration A in FIG. 2. Between the rear side 24 of the display device 20 and the base surface 13''' located there of the cutout 11' formed in the molded plastics part 13' for the display device 20, an adhesion-promoting layer 26 is provided, which consists for example of an adhesive or another adhesion agent.

The enlarged illustration of detail A of FIG. 2 also shows how a connecting piece 25 engages from the rear surface 24 of the display device 20 through an opening 17 in the molded plastics part 13'. The connecting piece 25 guides electrical connection cables 25', 25" from the display device 20 to a display device controller 28, which is provided on the inside of the vehicle door 12 and is illustrated only schematically in FIG. 2A. The display device controller 28, which has a control computer 27 with a data memory 27' assigned thereto, is also assigned a position data receiver 29.

The display 30 of the display unit 3 provided in the rear door 14 is set up in the same way and integrated into the molded plastics part 15' of the rear door 14 in the same way.

The display device 20, 30 can be integrated into the molded plastics part 13' of the front door 12 and, respectively, into the molded plastics part 15' of the rear door 14 in two different ways, specifically by overmolding the display device in a corresponding injection mold during the production of the respective molded plastics part 13', 15', or by common deep drawing of the molded plastics part and of the display device. In the latter case, the display device 20, 30 can be placed into a molding element of a deep-drawing mold before a blank plastics part for the molded plastics part 13', 15' is then placed into the molding element of the deep-drawing mold, whereupon the display device 20, 30 and the blank plastics part are then deep-drawn together in the deep-drawing mold to form the unit composed of the molded plastics part 13', 15' and the display device 20, 30. Here, an adhesion promoter forming the adhesion-promoting layer 26 can be provided in order to firmly connect the respective display device 20, 30 to the assigned molded plastics part 13', 15' and in the process to also fill the groove enclosing the respective display device 20, 30. Alternatively, the respective display device 20, 30 and the respective blank plastics part, which later forms the molded plastics part 13', 15', can be connected to one another, for example by means of an adhesion promoter forming the adhesion-promoting layer 26, before being placed into the deep-drawing mold. Next, the unit composed of the blank plastics part and the assigned display device 20, 30 is placed into the deep-drawing mold and deep drawn.

The respective display device 20, 30 is preferably a display device operating in accordance with the principle of electronic paper (also referred to as E Ink method). In this case, an electric field, in which partially colored bodies contained in the display device 20, 30 in a liquid reorient themselves and thereby form black or colored pixels, is applied once merely to form the display in the respective display device 20, 30. The display thus formed remains intact even when the electric field has been switched off for a few days or weeks, which means that the display remains visible even when the vehicle is turned off, without consuming electrical energy for this purpose. A new electric field needs to be applied again for a short period of time only for changing the display on the respective display device 20, 30 or—after some time—to refresh the display.

The invention is not restricted to the aforementioned exemplary embodiment, which serves merely to generally explain the core idea of the invention. Rather, the apparatus according to the invention can also have configurations that differ from the one described above within the scope of protection. The apparatus can here have in particular features that represent a combination of the respective individual features of the claims.

Reference signs used in the claims, the description, and the drawings merely serve for better comprehension of the invention and are not intended to restrict the scope of protection.

LIST OF REFERENCE SIGNS

1 Vehicle
2 Display unit
3 Display unit
10 Vehicle body
11 Body outer skin
11' Cutout
12 Left front door
13 Door leaf
13' Molded plastics part
13" Surface of the molded plastics part 3'
13''' Base surface
14 Left rear door
15 Door leaf
15' Molded plastics part
16 Side window 17 Opening
20 Display device
22 Display area
22' Surface of the display area 22
24 Rear side of the display device
25 Connecting piece
25' Electrical connection cable
25" Electrical connection cable
26 Adhesion-promoting layer
27 Control computer
27' Data memory
28 Display device controller
29 Position data memory
30 Display device
32 Display area
d Thickness of the display device

The invention claimed is:

1. A method for integrating a display device into a body outer skin of a vehicle in a region of a body of the vehicle, wherein the body outer skin is formed by a molded plastics part at least in said region of the body or at least has such a molded plastics part, the method comprising:
forming the display device together with the molded plastics part in a common molding step to form a body contour, wherein
a display area of the display device faces away from the molded plastics part.

2. The method according to claim 1, wherein
the display device is connected to the molded plastics part in the common molding step.

3. The method according to claim 2, further comprising:
providing an adhesion promoter between a rear surface of the display device facing away from the display area of the display device and a surface of the molded plastics part facing the rear surface.

4. The method according to claim 1, wherein the molded plastics part is formed as an injection molding part, the method further comprising:
placing the display device into a molding element of an injection mold;
closing the injection mold and injecting plastics material for the molded plastics part into the injection mold; and
removing the molded plastics part connected to the display device from the injection mold when opened.

5. The method according to claim 1, wherein the molded plastics part is formed as a deep-drawn molded part, the method further comprising:
placing the display device into a molding element of a deep-drawing mold;
placing a blank plastics part for the molded plastics part into the molding element of the deep-drawing mold;
deep drawing the display device and the blank plastics part; and
removing the molded plastics part connected to the display device from the deep-drawing mold.

6. The method according to claim 5, wherein
a rear surface of the display device facing away from the display area of the display device is provided with an adhesion promoter before the blank plastics part is placed into the molding element of the deep-drawing mold.

7. The method according to claim 1, wherein the molded plastics part is formed as a deep-drawn molded part, the method further comprising:
connecting the display device to a blank plastics part,
placing the blank plastics part and the display device as a unit into a deep-drawing mold,
deep drawing the unit composed of the blank plastics part and the display device to form a molded plastics part connected to the display device, and
removing the molded plastics part connected to the display device from the deep-drawing mold.

8. A vehicle, comprising:
a vehicle body having a body outer skin;
a display unit having at least one display device integrated in the body outer skin by forming the display device together with a molded plastics part in a common molding step to form a body contour, wherein a display area of the display device faces away from the molded plastics part;
a display device controller of the display unit electrically connected to the display device.

9. The vehicle according to claim 8, wherein
the display device has electrodes and a fluid provided with electrically charged particles, and
the display device operates according to an electrophoresis principle,
wherein an electric field applied to the electrodes of the display device effects an alignment of the electrically charged particles in the fluid.

10. The vehicle according to claim 8, wherein
the display device is a reflective display device and has electrodes and a fluid provided with electrically charged particles, and
the display device is designed such that, by applying an electric field once, a display is permanently displayed without need for float voltage, wherein the display is deleted or changed by applying an electric field again.

11. The vehicle according to claim 10, wherein
the display device operates according to an electrophoresis principle, wherein the electric field applied to the electrodes of the display device effects an alignment of the electrically charged particles in the fluid.

12. The vehicle according to claim 8, wherein
the display device controller has a position data receiver or is connected with such a position data receiver and is configured to be able to ascertain its own current location, and
the display device controller is configured to display on the display device, in the form of text data and/or image data, static or dynamic texts and/or images that are stored in a data memory assigned to the display device controller, in dependence on its own current location.

13. The vehicle according to claim 8, wherein
the vehicle is equipped with a user identification system, and
the display device controller is configured to display on the display device, in the form of text data and/or image data, static or dynamic texts and/or images that are stored in a data memory assigned to the display device controller, in dependence on user identification data ascertained by the user identification system.

* * * * *